United States Patent [19]

Reed et al.

[11] Patent Number: 4,660,951

[45] Date of Patent: Apr. 28, 1987

[54] COLLAPSIBLE DISPOSABLE CAMERA WITH EXTERNAL FILM DEVELOPMENT MEANS

[75] Inventors: Richard K. Reed, Pendleton; James R. Reed, Indianapolis, both of Ind.; James D. Sorg, 1709 Queensbridge Dr., Indianapolis, Ind. 46219

[73] Assignee: James D. Sorg, Indianapolis, Ind.

[21] Appl. No.: 900,190

[22] Filed: Aug. 25, 1986

Related U.S. Application Data

[63] Continuation of Ser. No. 713,200, Mar. 18, 1985, abandoned, which is a continuation-in-part of Ser. No. 577,491, Feb. 6, 1984, Pat. No. 4,518,235.

[51] Int. Cl.$^4$ .................... G03B 17/04; G03B 17/52
[52] U.S. Cl. .................................... 354/187; 354/85; 354/245; 354/288; 354/304
[58] Field of Search .................. 354/83, 84, 85, 86, 354/187, 192, 193, 194, 202, 245, 248, 249, 288, 301, 302, 303, 304

[56] References Cited

U.S. PATENT DOCUMENTS

| | | | |
|---|---|---|---|
| 2,143,385 | 1/1939 | Platt | 354/187 |
| 2,323,009 | 6/1943 | Claudot et al. | 354/288 |
| 2,845,850 | 8/1958 | Bing et al. | 354/85 |
| 2,854,904 | 10/1958 | Bishop | 354/85 |
| 2,933,027 | 4/1960 | Hollingworth et al. | 354/212 |
| 3,412,662 | 11/1968 | Balalis | 354/202 |
| 3,455,222 | 7/1969 | Downey | 354/86 |
| 3,537,371 | 11/1970 | Finelli | 354/304 |
| 3,547,020 | 12/1970 | Goldfarb | 354/90 |
| 4,329,037 | 5/1982 | Caviness | 354/187 |

Primary Examiner—A. A. Mathews
Attorney, Agent, or Firm—Woodard, Weikart, Emhardt & Naughton

[57] ABSTRACT

A disposable camera constructed to produce a single photograph and to collapse to a stored position. A top wall and bottom wall are spaced apart by a pair of inwardly folding side walls and a pair of outwardly folding side walls. A negative and associated photographic paper is slidably mounted in the camera. An externally located pair of pressure jaws receive the film and paper to break a packet of development material mounted to the paper and negative and subsequently apply the material onto the paper. The camera is disposable after one exposure whereas the jaws are retained for use with the next camera. A shutter is moveable across an aperture in the front wall to allow light to pass to the negative.

18 Claims, 11 Drawing Figures

COLLAPSIBLE DISPOSABLE CAMERA WITH EXTERNAL FILM DEVELOPMENT MEANS

REFERENCE TO RELATED APPLICATION

This application is a continuation of application Ser. No. 713,200, filed Mar. 18, 1985 now abandoned, which is a continuation-in-part of our co-pending U.S. patent application Ser. No. 577,491 filed Feb. 6, 1984 and now U.S. Pat. No. 4,518,235 and entitled Collapsible Disposable Camera.

BACKGROUND OF THE INVENTION

This invention is in the field of cameras and more specifically those which may be collapsed in a stored condition and subsequently discarded after a single use. Cameras typically are quite expensive and thus are designed to have a relatively long life. Many instances occur, however, when only a single photograph is required allowing for the subsequent discarding of the camera if it were not for the high cost of the camera. For example, many insurance companies require the insurance applicant to submit a photograph of a building prior to issuance of insurance relating to the building. Lengthy delays are incurred in view of the time required to develop the typical camera film assuming a self-developing camera is not immediately available. In such a case, it is extremely advantageous for a self developing, low cost camera to be available allowing discarding of the camera after a single use. It also is desirable for such a camera to be collapsible in order for the insurance company to initially mail or otherwise provide the disposable camera to the insurance applicant. Heretofore, it has not been known to provide such a camera which is both collapsible to facilitate the mailing thereof and constructed to issue a single self-developing photograph while at a low cost to allow the discarding thereof after a single use. Disclosed herein is such a camera.

Our aforementioned camera includes rollers mounted therein to facilitate the breaking open of the film development material attached to the film packet and the subsequent application of the material directly onto the film. These rollers add to the expense and bulk of the camera and thus it is preferred to remove same and instead provide a film development mechanism separate from the camera. Such an approach allows the user to discard the camera after a single use while saving the film development mechanism for subsequent uses. Disclosed herein is the external film development mechanism along with the accompanying collapsible disposable camera.

U.S. Pat. No. 3,412,662, issued to Balais on Nov. 26, 1968 discloses a disposable camera produced from a plastic material without the collapsible mailing feature of the camera disclosed herein. Another plastic camera is disclosed in U.S. Pat. No. 2,933,027, issued to Hollingworth et al. on Apr. 19, 1960, whereas U.S. Pat. Nos. 2,323,009, issued to Claudot et al. on June 29, 1943 and 3,547,020, issued to Goldfarb on Dec. 15, 1970, respectively relate to a photographic apparatus made up of a series of detachable parts and to a compact toy camera. A collapsible camera is shown in U.S. Pat. No. 2,143,385 issued to Platt.

SUMMARY OF THE INVENTION

One embodiment of the present invention is a disposable camera comprising a camera box having an aperture and being moveable between a collapsed position and an erected position, a lens mounted over the aperture, shutter means mounted to the box adjacent the aperture and operable to open and close the aperture allowing light therethrough, a single film packet slidably mounted in the camera box and including a sleeve and a single film slidably mounted within the sleeve with the packet further having photographic paper and development material positioned within the sleeve, a guide mounted within the camera box and slidably receiving the film packet and opening exteriorly of the camera box allowing the sleeve to be moved therethrough, stop means on the sleeve limiting outward movement of the sleeve as the sleeve is moved through the guide uncovering the film and allowing an unobstructed view from the aperture to the film and, holding means attaching the film to the camera box and limiting movement of the film as first the sleeve is pulled outwardly uncovering the film and then pushed back into the camera covering the film allowing the film packet to be removed from the camera box for subsequent development.

A further object of the present invention is a disposable camera comprising a collapsible, throw-away, single use camera box including a front wall with aperture, a back wall with an interior guide and foldable side walls connecting the front wall to the back wall, a lens mounted to the front wall and aligned with the aperture, shutter means mounted to the front wall and operable to open and close the aperture, photographic negative fixedly mounted to the camera box for the life of the camera box to receive a light image from the aperture, and a sleeve with photographic paper slidably mounted to the guide and positioned atop the negative between the aperture and negative but slidably away from the negative for exposure through the aperture and slidably to cover the negative prior to removal of the negative and paper for external development.

Yet another embodiment of the present invention is a tool to develop a film packet having development chemicals positioned therein for depositing between the photographic paper and negative within the packet comprising a main body with a pair of spring biased jaws defining a channel to forceably and slidably move the film packet through releasing the chemicals onto the paper and the negative.

It is an object of the present invention to provide a new and improved camera.

A further object of the present invention is to provide a relatively low cost disposable camera.

Yet another object of the present invention is to provide a collapsible camera which will issue a single photograph which may be developed to external to the camera.

Further, it is an object of the present invention to provide means located external to a camera for applying developing pressure to a self-developing photograph.

In addition, it is an object of the present invention to provide a collapsible, disposable camera having external cooperative means to develop a photograph issuing from the camera.

Related objects and advantages of the present invention will be apparent from the following description.

DESCRIPTION OF THE PREFERRED EMBODIMENTS

Figure 1:
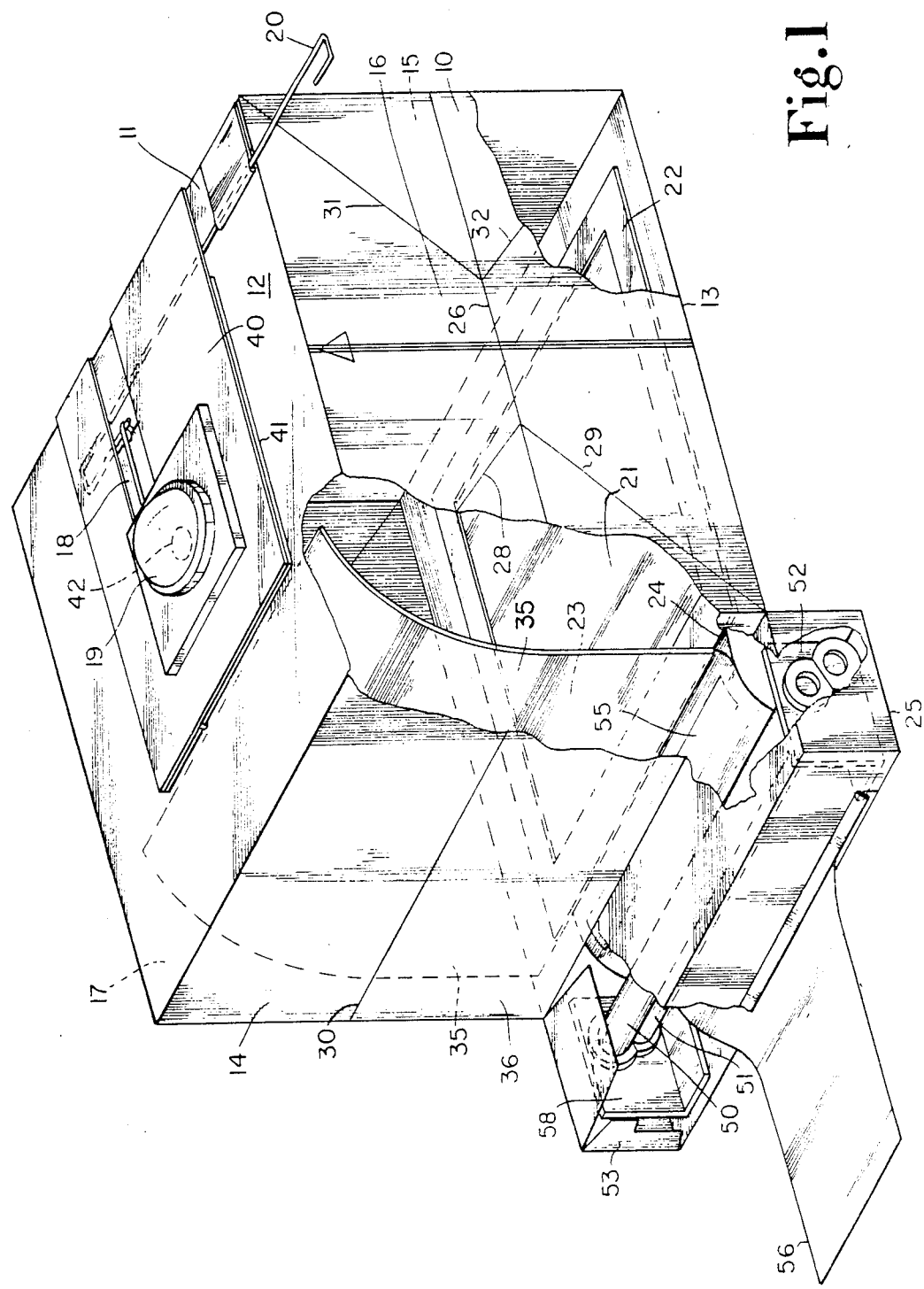
FIG. 1 is a fragmentary perspective view of a camera incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a camera 10 having a collapsible main body 11 constructed of a low cost material such as paper, cardboard or fabric. Main body 11 includes a front wall 12 and a back wall 13 connected together by a pair of inwardly folding end walls 14 and 15 and a pair of outwardly folding side walls 16 and 17. An aperture 42 is provided in wall 12 and is closable by a shutter 18 disposed between the aperture and a fixed focal length non-adjustable lens 19. A shutter release 20 is operable to allow the user to control movement of the shutter past the aperture.

Located beneath the aperture and adjacent wall 13 is a sheet of photographic film 21 slidably mounted in a guide 22 and alignable with photographic paper 23 as the paper and film exit main body 11 via slot 24 with the film and photographic paper passing through a development mechanism 25 attached to main body 11 adjacent slot 24.

Figure 2:
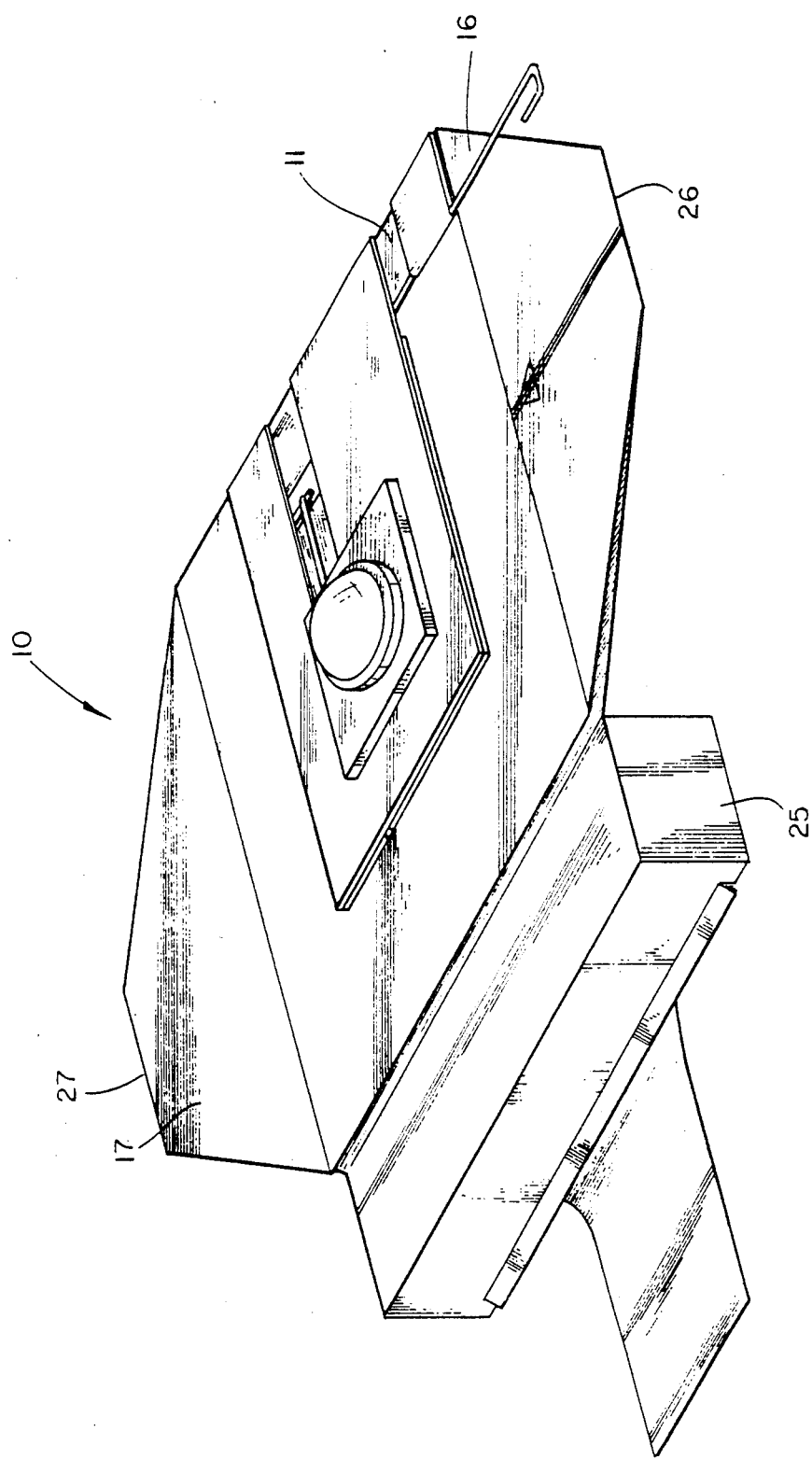
FIG. 2 is a perspective view of the camera of FIG. 1 shown in the collapsed state.

Camera 10 is moveable between an erected position shown in FIG. 1 to the collapsed position shown in FIG. 2. Both side walls 16 and 17 are foldable respectively along their lengthwise extending centerline 26 and 27. Further, the four corner edge portions of each side wall are folded inwardly to facilitate the inward folding of end walls 14 and 15. For example, a pair of diagonally extending crease lines 28 and 29 extend from centerline 16 divergingly outward to the top and bottom corners of side wall 16 immediately adjacent end wall 14. Thus, as side wall 16 folds outwardly, the portion of the side wall defined between crease lines 28, 29 and that portion of side wall 16 immediately adjacent end wall 14 folds inwardly along with end wall 14 which is creased along its lengthwise extending centerline 30. Likewise, a pair of diagonally extending crease lines 31 and 32 extend from centerline 26 towards the top and bottom corner of side wall 16 immediately adjacent end wall 15 with the portion of side wall 16 defined between crease lines 31 and 32 and end wall 15 folding inwardly with wall 15 as the camera is collapsed. End wall 15 likewise includes a lengthwise extending centerline defining a crease line to facilitate the inward folding of the end wall. Side wall 17 is constructed in a similar fashion to side wall 16 to allow the outward folding of side wall 17 when the camera is moved to the collapsed condition shown in FIG. 2.

Figure 3:
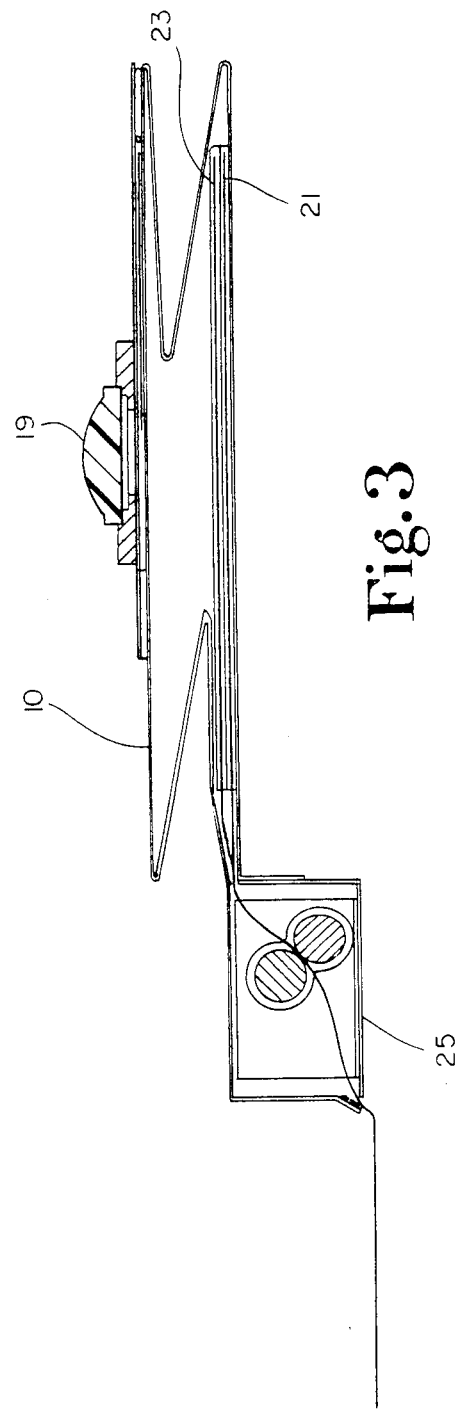
FIG. 3 is a cross-sectional view of the camera shown in the collapsed condition.

As the camera is collapsed, it is imperative that the film 21 or photographic paper 23 not be creased. The creasing of either the film or photographic paper will result in improper developing due to misalignment of the negative with respect to the aperture or misalignment as the photographic paper and negative pass through the self-developing apparatus 25. In the prior art cameras, the negative is usually positioned closer to the aperture than the photographic paper which is curled beneath the negative. Upon exposure of the negative, the negative and photographic paper in the prior cameras are then wrapped around a pair of rollers to position the exposed surface of the negative next to the photographic paper. Such an approach is impossible in the camera disclosed herein since such a roller structure will result in creasing or misalignment of the negative and paper. Therefore, the negative 21 is positioned adjacent the bottom wall 13 of the camera and is slidably mounted in a negative guide 22 fixedly attached to the bottom wall 13. Guide 22 includes a pair of mutually opposed grooves to slidably receive the opposite longitudinally extending edges of the negative. Likewise, the photographic paper 23 is slidably mounted in a sleeve or guide 35 affixed to the bottom foldable portion 36 of end wall 14. Sleeve 35 extends from the bottom edge of wall 14 past centerline 30 and then curls upwardly against wall 12. Photographic paper 23 extends freely within sleeve 35 and is also curled adjacent the top half of end wall 14 and the bottom surface of top wall 12 with the top edge of the sleeve and photographic paper being located between end wall 14 and lens 19 allowing for an unobstructed passage of light from the aperture beneath lens 19 to the upwardly facing surface of negative 21. Sleeve 35 extends entirely around photographic paper 23 in order to prevent light from reaching the paper. As the camera is collapsed, as shown in FIG. 2, the photographic paper 23 is merely positioned along with sleeve 35 atop guide 22 and negative 21 preventing creasing of the photographic paper. As shown in the cross-sectional view of FIG. 3, the photographic paper 23 is positioned parallel and above negative 21.

Figure 4:
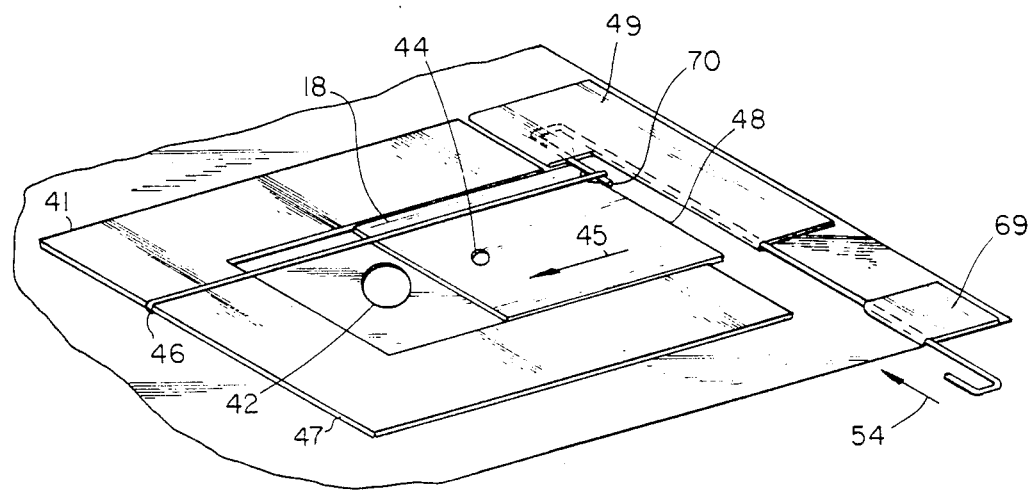
FIG. 4 is an enlarged fragmentary perspective view of the aperture and shutter combination.
Figure 5:
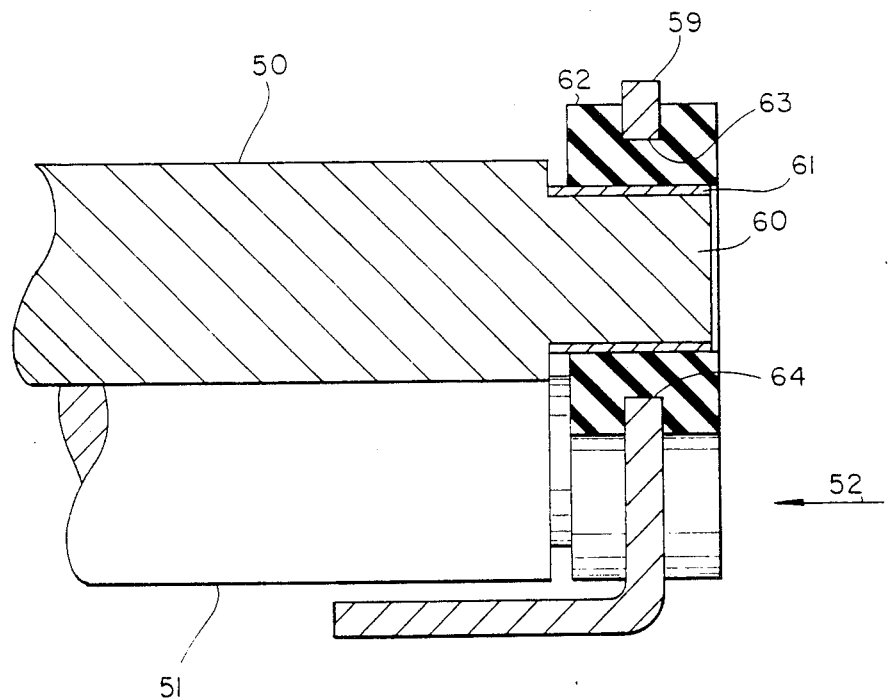
FIG. 5 is an enlarged cross-sectional view of bracket 52 showing the mounting of one of the rollers.

A pair of cardboard sheets 40 and 41 are fixedly mounted atop wall 12. The opposite edge portions of sheets 40 and 41 are secured together; however, the sheets are spaced apart their remaining portions to slidably receive a shutter sheet 18. An aperture hole 42 extends through wall 12 and sheets 40 and 41 with a fixed focal lens 19 being aligned with the aperture hole 42 and fixedly mounted atop sheet 40. Lens 19 and sheet 40 are removed from the top wall 12 in FIG. 4 to illustrate hole 42 in relationship to the shutter sheet 18. Shutter sheet 18 includes a shutter hole 44 which passes over and past aperture hole 42 as the shutter sheet moves in the direction of arrow 45 allowing for a controlled amount of light or image to pass through the aligned holes 42 and 44 thereby exposing negative 21. An elastic band 46 extends around sheets 41 and 18 and is operable when released to urge shutter sheet 18 in the direction of arrow 45. One end of elastic band 46 engages edge 47 of sheet 41 whereas the opposite end of the band engages edge 48. A slot is provided in sheets 40 and 41 adjacent edge 48 of shutter sheet 18 and extending in the direction of arrow 45 to prevent interference between the elastic band and sheets 40 and 41 as the shutter sheet 18 is moved in the direction of arrow 45.

A wire shutter release 20 is slidably mounted in a pair of holders 49 and 69 fixedly attached to top wall 12. One end 70 of wire release 20 is curled to engage the elastic band 46 thereby preventing the elastic band from urging the shutter sheet in the direction of arrow 45. Once the wire release is moved in the direction of arrow 54, end 70 will disengage the elastic band allowing the band to contact edge 48 of the shutter sheet moving the shutter sheet in the direction of arrow 45 and shutter hole 44 past aperture hole 42. The shutter speed may be varied by changing the configuration of shutter hole 44. For example, an elongated shutter hole 44 with its major axis extending in the direction of arrow 45 will allow for a longer film exposure time whereas a circular shutter hole 44 will provide for a shorter film exposure time.

Self-developing mechanism 25 includes a pair of parallel rollers 50 and 51 having their opposite ends rotatably mounted in a pair of upstanding brackets 52 and 58 fixedly attached to a rectangular configured box 53 in turn attached to the main body 11 of the camera. Self-developing photographic paper and associated negative are commercially available and are well known in the field. The negative 21 includes a packet of film developing material 55 fixed thereto and when crushed passing between rollers 50 and 51 is applied to the photographic developing surface of photographic paper 23 facing negative 21. The photographic paper and negative are affixed together at their outer ends forming a tab 56 to allow the user to pull the paper and negative through the rollers once the shutter release system is operated. As tab 56 is pulled outwardly, chemistry packet 55 passes between the rollers and is released onto and between said negative and photographic paper thereby developing the photograph. The photographic paper is then removed from the negative.

It is imperative that the developing material from packet 55 be applied uniformly across the width of the photographic paper. It is therefore necessary to apply a uniform pressure across the photographic paper and negative as the two pass between the pair of rollers. A bearing system is utilized to hold the opposite ends of the rollers to ensure the uniform distribution of pressure applied by the rollers to the photographic paper and film. The bearings provided in bracket 52 will now be described it being understood that an identical bearing construction is provided for bracket 58.

Roller 50 has a reduced diametered end 60 rotatably mounted and extending through a metal bearing 61 in turn extending through a flexible grommet 62 made from a material such as rubber. Grommet 62 has a circumferentially extending groove 63 allowing the grommet to be mounted in an oversized hole 64 provided in wall 59 of bracket 52. The opposite end of roller 50 is mounted in identical fashion to bracket 58. Likewise, the opposite ends of roller 51 are rotatably mounted in identical fashion to a pair of sleeves and grommets mounted to brackets 52 and 58. Normally, rollers 50 and 51 are spaced apart 0.004 inches whereas the combined thickness of the chemical packet 55 and photographic paper along with negative amounts to 0.011 inches. Thus, the rollers must move further apart in the amount of 0.007 inches. The rubber grommet 62 receiving the opposite ends of the rollers therefore are compressed uniformly allowing for the rollers to spread apart the required distance of 0.011 inches applying uniform pressure between the photographic paper and negative. Each rod moves approximately 0.0035 inches off its centerline. In one embodiment, approximately seven pounds of force is required to move the rods apart the required distance.

The camera disclosed herein is constructed to be of relatively low weight and is collapsible in order to facilitate mailing of the camera. Further, the camera is inexpensive to produce and distribute, small in size and provides an instant photograph while being very easy to use.

Figure 6:
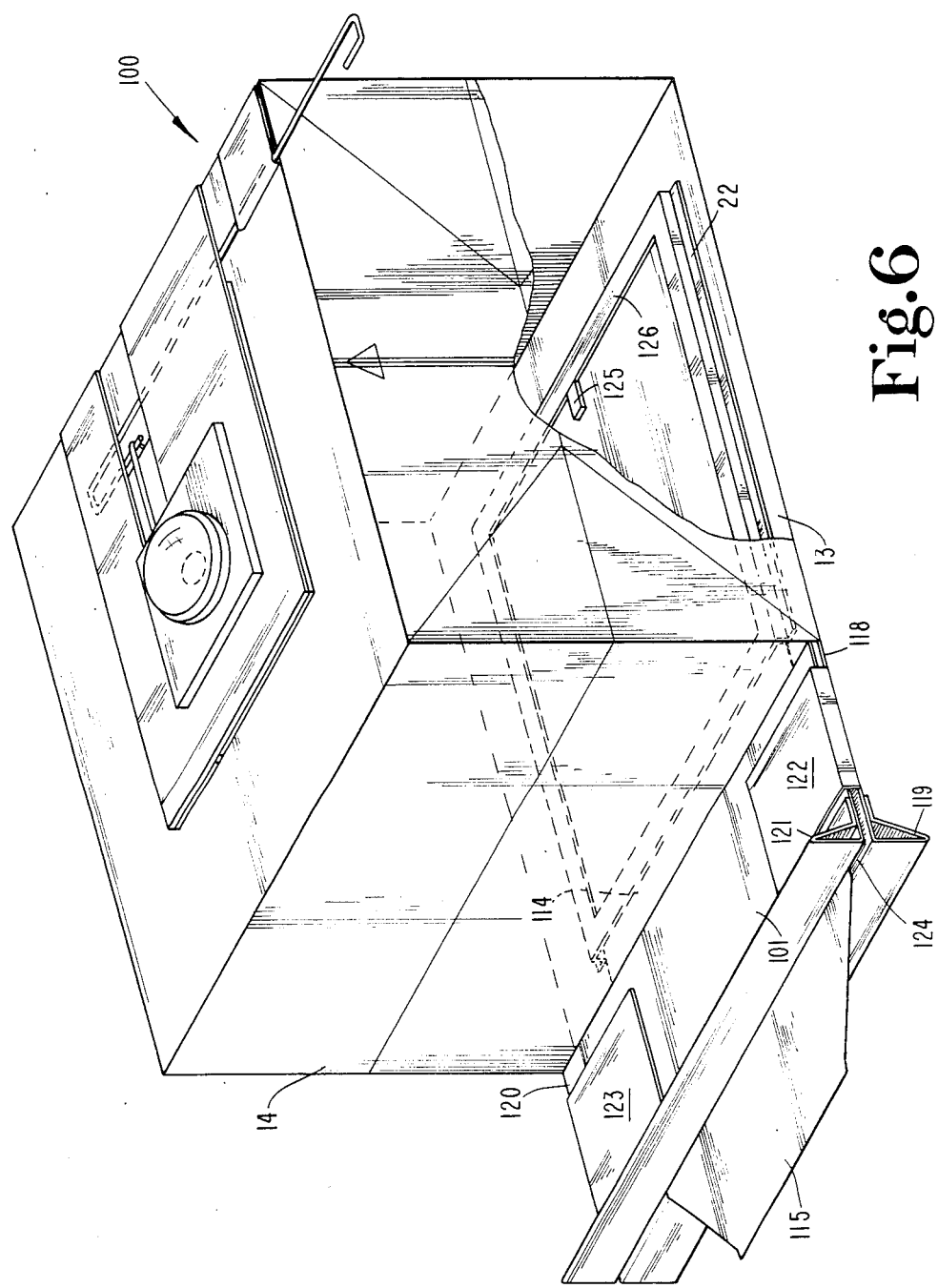
FIG. 6 is the same view as FIG. 1 only showing the preferred embodiment of the camera incorporating the present invention.
Figure 7:
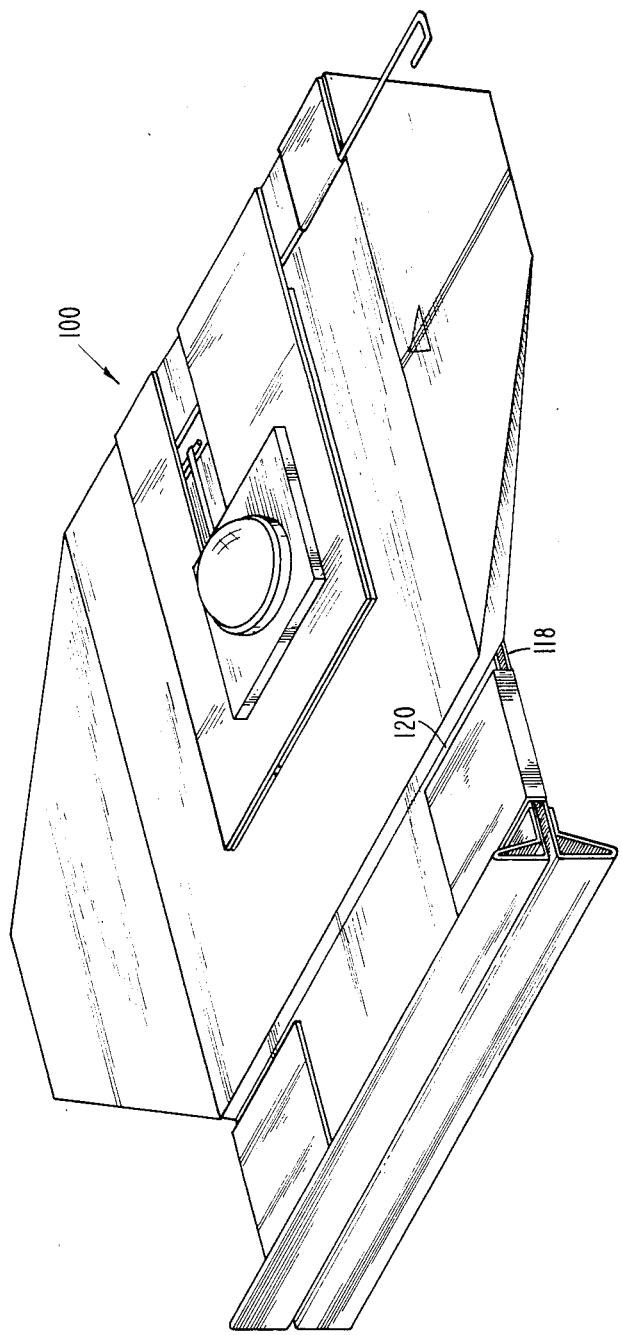
FIG. 7 is a perspective view of the camera of FIG. 6 shown in the collapsed state.
Figure 8:
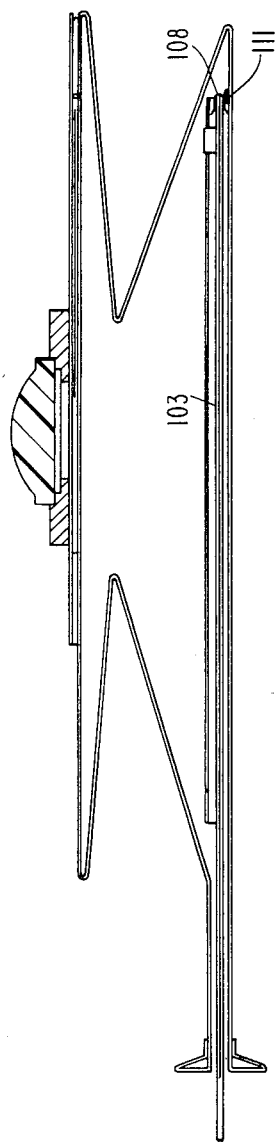
FIG. 8 is a cross-sectional view of the camera of FIG. 6 shown in the collapsed condition.
Figure 9:
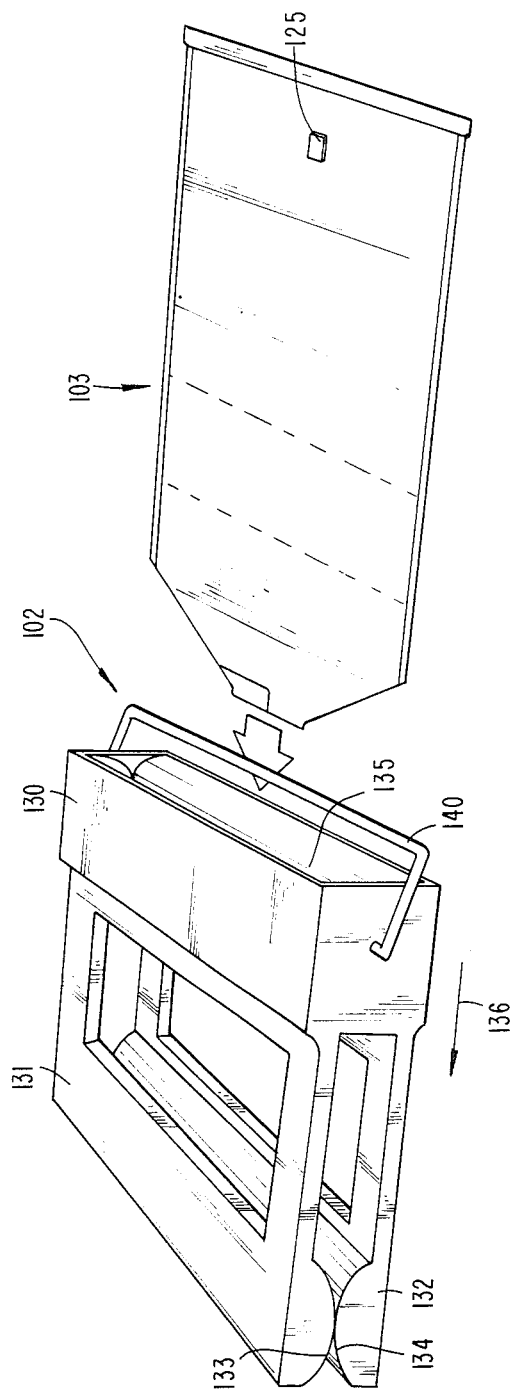
FIG. 9 is a perspective view of the pressure developing means and film packet to be used with the camera of FIG. 6.

The preferred embodiment of the camera is shown in FIGS. 6 through 8 and is identical to the camera previously described and shown except that the development mechanism 25 is removed from the camera and replaced with a packet guide 101 and an externally located development mechanism 102 (FIG. 9). Further, the photographic paper sleeve 35 is not provided in the preferred embodiment of camera 100 shown in FIG. 6. Thus, camera 100 has a pair of side and end walls connected to a bottom and top wall in an identical manner as camera 10 and has the same aperture, lens and shutter mechanism. Camera 100 is collapsible, erectable and disposable and is produced from a low-cost material such as, plastic or paper-board.

Figure 10:
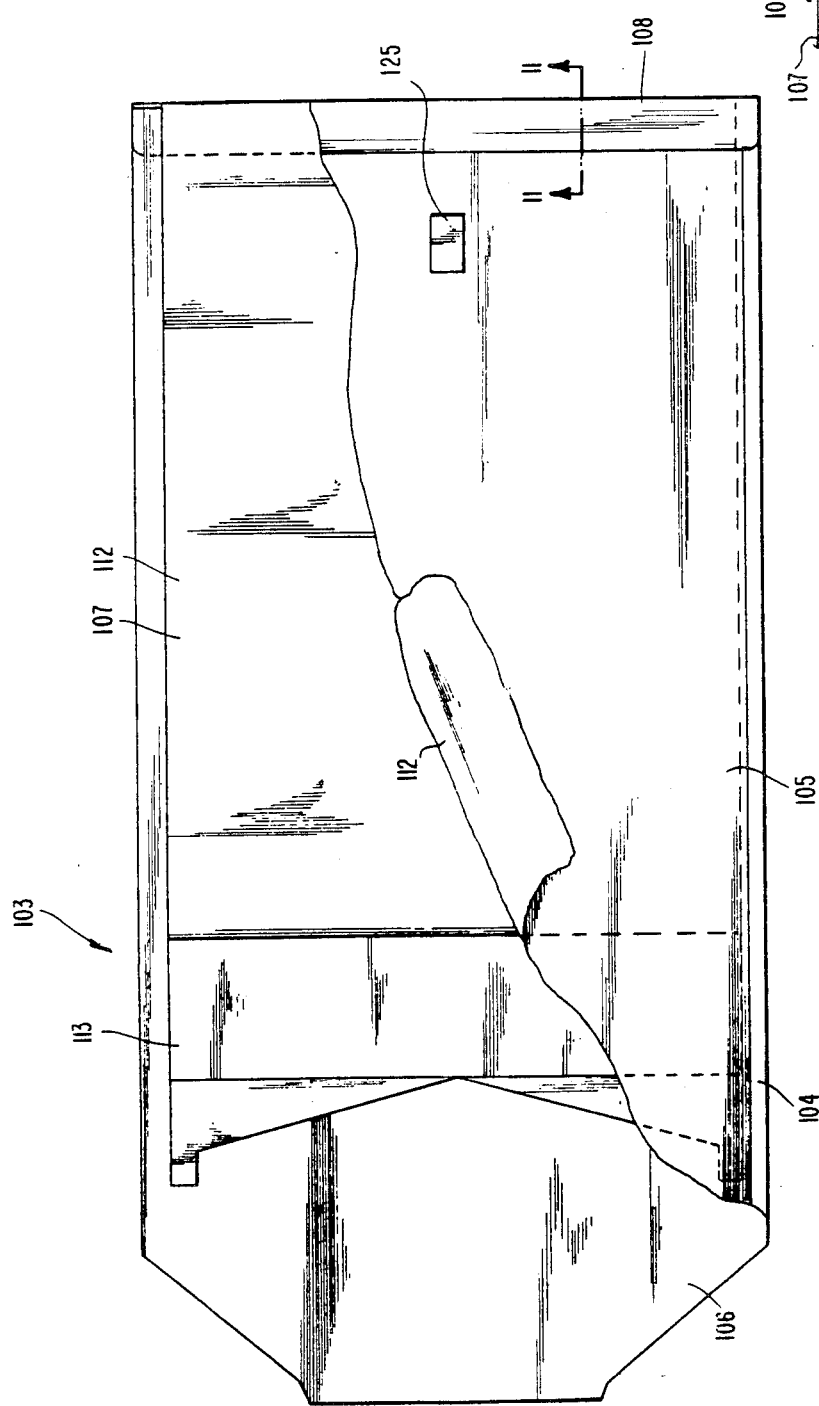
FIG. 10 is a fragmentary plan view of the film packet used with the camera of FIG. 6.
Figure 11:
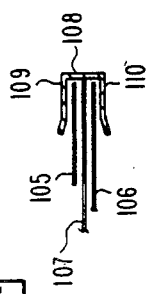
FIG. 11 is a fragmentary cross sectional view taken along the line 11—11 of FIG. 10 and viewed in the direction of the arrows.

Film packet 103 (FIG. 9-11) is commercially available from the Polaroid Corporation under the product name Type 52 Polapan for use with the 4×5 Land Film camera. Packet 103 includes a jacket 104 with a top wall 105 attached at its longitudinal edges to a bottom wall 106 thereby forming a sleeve slidably receiving film 107. A U-shaped metal member 108 is fixedly attached to one end of film 107 and slidably receives between its legs 109 and 110 the adjacent end portions of top wall 105 and bottom wall 106. A strip 113 of caustic developing jelly is mounted adjacent one end of film 107 with the photographic paper 112 mounted to and positioned interiorly to top wall 105 and aligned with that portion of film 107 to be exposed to light through the shutter mechanism.

Film packet 103 is positioned within the camera with the photographic paper 112 on top wall 105 facing downwardly away from the aperture of the camera. The packet is slidably mounted in the guide 22 fixedly mounted atop the bottom wall 13 of the camera 100. Guide 22 is open at end 114 allowing tab 115 of the jacket 104 to extend outwardly from the camera. Member 108 is fixedly attached to the bottom wall of the camera by glue, tape 111 (FIG. 8) or other suitable material.

Bottom wall 13 extends outwardly beyond end wall 14 forming an extension 118 having a downwardly turned distal end 119. End wall 14 extends through a 90 degree angle forming an extension 120 parallel with and above extension 118. The distal end 121 of extension 120 extends upwardly and cooperatively with end 119 to form a handle for grasping as tab 115 is pulled outwardly or forced inwardly. A pair of tabs 122 and 123 attached to extension 118 extend upwardly and atop extension 120 being fixedly attached thereto securing extension 118 and 120 together but allowing for the formation of a channel 124 therebetween through hich the jacket 104 is slidably received.

A projection 125 is fixedly attached atop top wall 105 of jacket 104 and is positioned adjacent cross member 126 of guide 22 (FIG. 6) when the jacket is in the most inward position. In order to operate camera 100, the camera is erected and tab 115 is pulled to the most outward position allowing for an unobstructed view from the film 107 to the camera aperture. Projection 125 contacts cross member 114 of guide 22 limiting the amount of outward travel of jacket 104 but allowing for the complete exposure of the film once the shutter is operated. As the tab is pulled outwardly, the film 107 remains in a stationary position due to the fixing of the bracket 108 to the bottom wall 13. After the shutter is opened and closed, the jacket 104 is pushed back into the camera to once again enclose the film 107. The bottom wall 13 of the camera is then opened and in the process the camera is destroyed. The film packet 103 including the jacket 104 along with the film 107 is removed from the bottom wall 13 and camera for development with the development mechanism 102.

Development mechanism 102 includes a main body 130 with a pair of spring biased jaws 131 and 132. The mutually facing surfaces 133 and 134 of the jaws are radiused forming smooth surfaces to receive film packet 103 as it is slidably moved through a slot 135 extending completely through the length of main body 130. Slot 135 is aligned with the opening existing between surfaces 133 and 134 of the jaws 131 and 132. Surfaces 133 and 134 are spaced apart approximately the same spacing existing between rollers 50 and 51 of the development mechanism shown in FIG. 1 or in other words approximately 0.004 inches. Since the thickness of packet 103 is approximately 0.011 inches, the jaws squeeze the caustic jelly strip 113 causing the jelly to flow outwardly between the photographic paper 112 and film 107. Development mechanism 102 is produced from plastic allowing the jaws to be spaced apart a constant distance along their length but to move further apart to a second distance as the film packet 103 is moved therethrough in the direction of arrow 136. Once the packet moves completely through the jaws, then the photographic paper is removed from the packet. A handle 140 is pivotally mounted to the main body 130 of the development mechanism.

While the invention has been illustrated and described in detail in the drawings and foregoing description, the same is to be considered as illustrative and not restrictive in-character, it being understood that only the preferred embodiments have been shown and described and that all changes and modifications that come within the spirit of the invention are desired to be protected.

The invention claimed is:

1. A disposable camera comprising:
   a camera box having an aperture and being moveable between a collapsed position and an erected position;
   a lens mounted over said aperture;
   shutter means mounted to said box adjacent said aperture and operable to open and close said aperture allowing light therethrough;
   a single film packet slidably mounted in said camera box and including a sleeve and a single film slidably mounted within said sleeve with said packet further having photographic paper and development material positioned within said sleeve;
   a guide mounted within said camera box and slidably receiving said film packet and opening exteriorly of said camera box allowing said sleeve to be moved therethrough;
   stop means on said sleeve limiting outward movement of said sleeve as said sleeve is moved through said guide uncovering said film and allowing an unobstructed view from said aperture to said film; and,
   holding means attaching said film to said camera box and limiting movement of said film as first said sleeve is pulled outwardly uncovering said film and then pushed back into said camera covering said film allowing said film packet to be removed from said camera box for subsequent development.

2. The camera of claim 1 wherein said box includes a front wall, back wall and side walls connecting together said front wall and back wall, said side walls are foldable allowing said box to assume said collapsed position;
   said shutter means includes a member having an opening slidably mounted to said front wall and an elastic device engageable with said member, said shutter means further includes release means engaged with said elastic device and operable to release said elastic device against said member to slide said member and move said opening past said aperture.

3. The camera of claim 1 and further comprising:
   photo developing means external of said box and operable to press said paper and film together to develop a photo on said paper.

4. The camera of claim 3 wherein said photo developing means includes a pair of spring biased jaws normally spaced apart a first constant distance along their lengths operable to allow said constant distance to increase to a second constant distance as said film packet moves therebetween.

5. The camera of claim 4 wherein said box is constructed at least partially of a paper material and includes a front wall with said lens mounted thereon, a back wall adjacent of which is located said film packet and a pair of side walls folding outwardly when said box is in said collapsed position and when pushed inwardly erecting said box to said erected position.

6. The camera of claim 1 wherein said stop means includes a projection mounted atop said film packet and engageable with said guide when said sleeve is pulled outwardly.

7. A disposable camera comprising:
   a collapsible, throw-away, single use camera box including a front wall with aperture, a back wall with an interior guide and foldable side walls connecting said front wall to said back wall;
   a lens mounted to said front wall and aligned with said aperture;
   shutter means mounted to said front wall and operable to open and close said aperture;
   photographic negative fixedly mounted to said camera box for the life of said camera box to receive a light image from said aperture; and,
   a sleeve with photographic paper slidably mounted to said guide and positioned atop said negative between said aperture and negative but slidably away from said negative for exposure through said aperture and slidably to cover said negative prior to removal of said negative and paper for external development.

8. The camera of claim 7 and further comprising developing means including a packet of photo development chemicals positioned adjacent said paper and a pair of jaws located remotely with respect to said box and with said jaws spaced apart a uniform distance along the length thereof;

tab means connected to said paper and extendable through said jaws being operable when pulled to force said paper and said negative to move through said jaws releasing said chemical and developing said paper.

9. The camera of claim 8 wherein said shutter means includes a member having an opening slidably mounted to said front wall and an elastic device engageable with said member and further having release means engaged with said elastic device and operable to release said elastic device against said member to slide said member and move said opening past said aperture.

10. The camera of claim 7 and further comprising:

a pair of spaced apart extensions fixedly mounted to said box and aligned with said guide to receive said sleeve with said extensions forming a handle for grasping as said sleeve is first pulled out uncovering said negative and then pushed back causing said negative to be covered prior to removal from said camera box.

11. A camera comprising:

a collapsible, erectable and disposable camera body including a front wall with aperture, a back wall and foldable side walls connecting said front wall to said back wall;

a lens aligned with said aperture;

shutter means;

photographic negative fixedly mounted to said camera body for the life of said camera;

a sleeve having photographic paper and having a first position being between said aperture and said negative and a second position being away from said negative for exposure, said sleeve being slidable from said first position to said second position, said sleeve being slidable from said second position to said first position to cover said negative prior to removal of said negative and paper for external development; and, means for guiding said sleeve between said first and second positions.

12. The camera of claim 11 wherein:

said guiding means includes a guide mounted to said back wall and further includes a projection mounted to said sleeve engageable with said guide to limit sleeve movement beyond said second position.

13. The camera of claim 12 and further comprising: developing means including a packet of photo development chemicals positioned adjacent said paper and a pair of jaws located remotely with respect to said camera body and with said jaws spaced apart a uniform distance along the length thereof.

14. The camera of claim 13 and further comprising:

tab means connected to said paper and extendable through said jaws being operable when pulled to force said paper and said negative to move through said jaws releasing said chemical and developing said paper.

15. The camera of claim 14 wherein:

said shutter means includes a member having an opening slidably mounted to said front wall and an elastic device engageable with said member and further having release means engaged with said elastic device and operable to release said elastic device against said member to slide said member and move said opening past said aperture.

16. The camera of claim 15 further comprising:

a pair of spaced apart extensions fixedly mounted to said camera body and aligned with said guide to receive said sleeve with said extensions forming a handle for grasping as said sleeve is pulled into said sleeve position uncovering said negative and then pushed back into said first position causing said negative to be covered.

17. The camera of claim 16 wherein:

said camera body is produced from a low-cost material such as paper-board.

18. A camera comprising:

a collapsible, erectable and disposable camera body including a front wall with aperture, a back wall and foldable side walls connecting said front wall to said back wall;

a lens aligned with said aperture;

shutter means;

photographic negative mounted to said camera body for the life of said camera;

a sleeve having photographic paper and having a first position being between said aperture and said negative and a second position being away from said negative for exposure, said sleeve being slidable from said first position to said second position, said sleeve being slidable from said second position to said first position to cover said negative prior to removal of said negative and paper for external development; and, means for guiding said sleeve between said first and second positions.

* * * * *